United States Patent [19]

Toriyama

[11] Patent Number: 4,930,830

[45] Date of Patent: Jun. 5, 1990

[54] BOX BLANK HOLDING DEVICE IN BOX-MAKING MACHINE

[75] Inventor: Daigoro Toriyama, Chiba, Japan

[73] Assignee: Tanabe Machinery Co., Ltd., Tokyo, Japan

[21] Appl. No.: 309,346

[22] Filed: Feb. 10, 1989

[51] Int. Cl.$^5$ .............................................. B66C 1/42
[52] U.S. Cl. .................................. 294/88; 294/119.1; 901/37
[58] Field of Search ............... 294/119.1, 88; 269/227, 269/157; 901/31, 36, 37, 39

[56] References Cited

U.S. PATENT DOCUMENTS

| 2,390,293 | 12/1945 | Colson | 294/119.1 X |
| 4,377,305 | 3/1983 | Horvath | 901/31 X |
| 4,591,198 | 5/1986 | Monforte | 901/39 X |
| 4,632,631 | 12/1986 | Dunlap | 901/31 X |
| 4,707,013 | 11/1987 | Vranish et al. | 294/119.1 |

FOREIGN PATENT DOCUMENTS

| 6603660 | 4/1969 | Fed. Rep. of Germany . |
| 2437475 | 2/1977 | Fed. Rep. of Germany . |
| 3115925 | 12/1982 | Fed. Rep. of Germany . |
| 3808799 | 9/1988 | Fed. Rep. of Germany . |
| 3735486 | 2/1989 | Fed. Rep. of Germany . |

OTHER PUBLICATIONS

IBM Technical Disclosure Bulletin, vol. 23, No. 11, Apr. 1981.

Primary Examiner—Margaret A. Focarino
Assistant Examiner—Dean J. Kramer
Attorney, Agent, or Firm—Wenderoth, Lind & Ponack

[57] ABSTRACT

A box blank holding device for a box-making machine. In a holder main body of the device, a driving rack is moved when air is supplied to and discharged from a cylinder connected to the rack. A transmission shaft is rotatably supported by the holder main body and has a pair of pinions, one in meshing engagement with the driving rack, and the other in meshing engagement with a pair of holding member-actuating racks disposed on either side thereof. A pair of blank holding members are pivotally mounted on the ends of the holding member-actuating racks in such a manner as to be retractable and projectable into spaced opposed relation facing each other for gripping box blanks therebetween and being guided by retracting-and-projecting guide plates mounted on the holder main body.

3 Claims, 4 Drawing Sheets

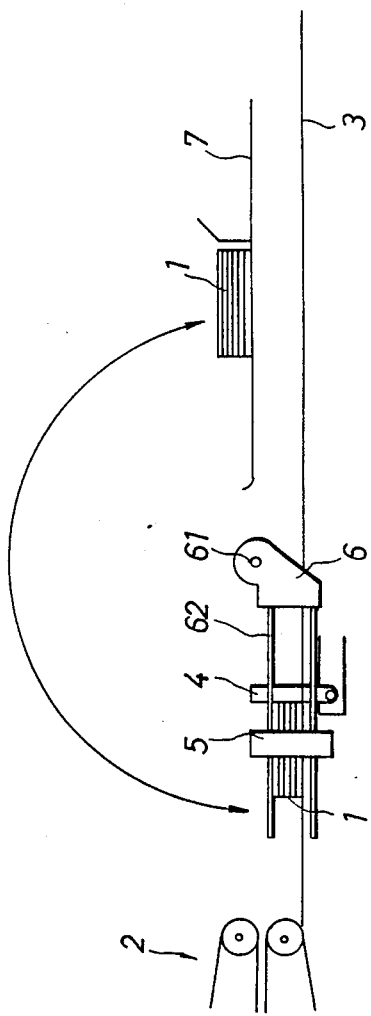
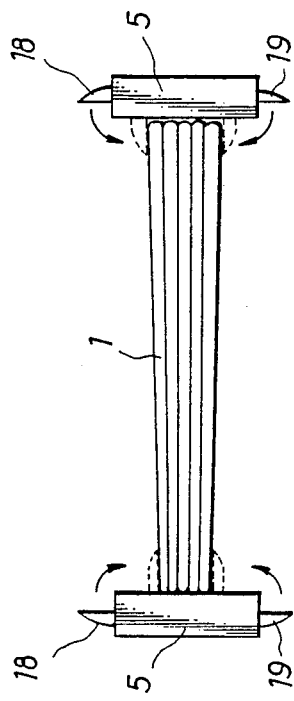

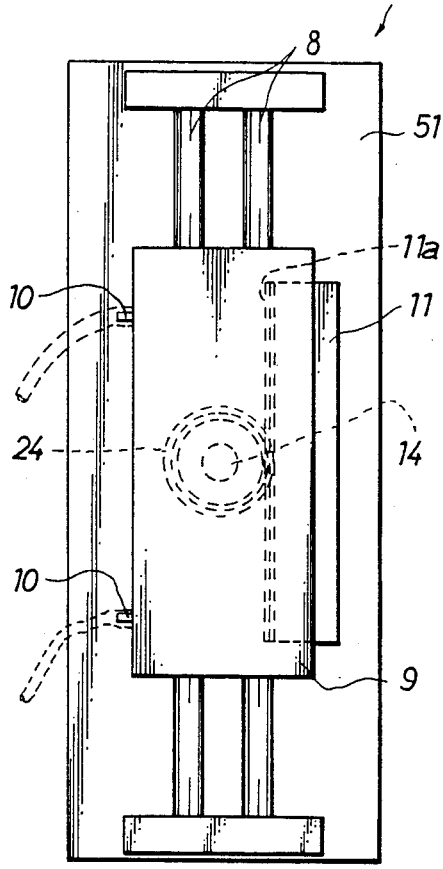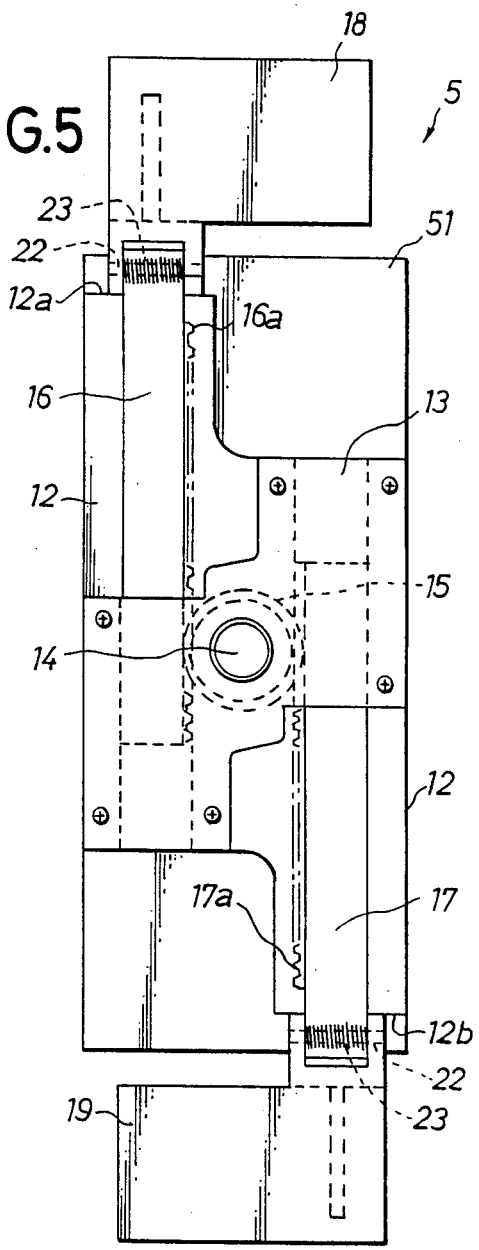

BOX BLANK HOLDING DEVICE IN BOX-MAKING MACHINE

BACKGROUND OF THE INVENTION

The present invention relates to a box blank holding device in a box-making machine, which device holds blanks while moving them to a predetermined position and, more specifically, to a device of this kind that is capable of securely holding box blanks, already folded by the machine, regardless of the thickness and the hardness or softness of the blanks.

Conventionally, a box blank holding device in a box-making machine has a pair of holding members projecting from a main body and adapted to, for example, be moved toward and away from each other by a gear mechanism so that the blanks are released when the holding members are moved away from each other. A means for moving the holding members toward and away from each other is adapted to, for example, move the pair of holding members close to each other until their positions are separated by a predetermined width in accordance with the thickness of the blanks to be held, which blanks may be arranged in a pile.

However, in the arrangement in which the pair of holding members project from the main body, they present obstacles to the feeding of blanks already folded by the box-making machine to the piling-up section of the machine, particularly when the holding members are adapted to hold opposite sides of the blanks. If the space between the pair of holding members is increased in order to overcome this inconvenience, however, the stroke of the holding members during their movement toward each other is increased correspondingly. Such an increase is not desirable from the practical point of view because it leads to a reduction in the efficiency of the work. In addition, because such an increase requires an increase in the length of the main body, the blank piling-up section may become large and, hence, the entire machine may become undesirably long and large.

Further, in the arrangement in which the pair of holding members are moved toward each other by a gear mechanism so as to be separated by a predetermined width, if, for instance, the total thicknesses of the piles of folded blanks varies among the piles, the result will be that a pile having a total thickness greater than the predetermined width will be held under a high pressure, whereas a pile having a total thickness less than the predetermined width will be held with a low pressure. Thus, there is a risk that the blanks in a pile may be damaged or that they may not be held securely. In order to avoid such a risk, it is necessary to adjust the space between the holding members for each pile, thereby adding an operational inconvenience.

SUMMARY OF THE PRESENT INVENTION

It is an object of the present invention to overcome the above-described inconveniences of the prior art apparatus and to provide a box blank holding device in a box-making machine, which is capable of securely holding box blanks regardless of the thickness and the hardness or softness of the box blanks.

According to the present invention, there is provided a box blank holding device in a box-making machine, comprising: a main body; a cylinder to which fluid such as air is supplied and from which it is discharged; a driving rack movable by the supply of air to and the discharge of air from the cylinder; a transmission shaft rotatably supported by the holder main body and having a pair of pinions, one of the pinions being in meshing engagement with the driving rack; a pair of holding member-actuating racks disposed on either side of the other pinion of the transmission shaft in meshing engagement with that pinion; retracting-and-projecting guide plates mounted on the holder main body; and a pair of holding members pivotally mounted on the ends of the holding member-actuating racks in such a manner as to be retractable and projectable while facing each other and being guided by the guide plates. The cylinder, the driving rack, the transmission shaft, the holding member-actuating racks, the retracting-andprojecting guide plates, and the holding members are all mounted on the holder main body.

BRIEF DESCRIPTION OF THE DRAWINGS

The drawings illustrate an embodiment of a box blank holding device in a box-making machine in accordance with the present invention, in which:

FIG. 1 is a fragmentary side view of an inverting mechanism of a box blank inverting apparatus incorporating the box blank holding device of the present invention;

FIG. 4 is an elevation view of the outer side of the holding device;

FIG. 5 is an elevation view of the inner side of the holding device; and

FIG. 6 is a schematic view used to explain a state in which box blanks are held.

DESCRIPTION OF THE PREFERRED EMBODIMENT

An embodiment of the present invention will be described below with reference to the accompanying drawings. In this embodiment, a box blank holding device in accordance with the present invention is used in a box blank inverting apparatus of a box-making machine.

Figure 2:
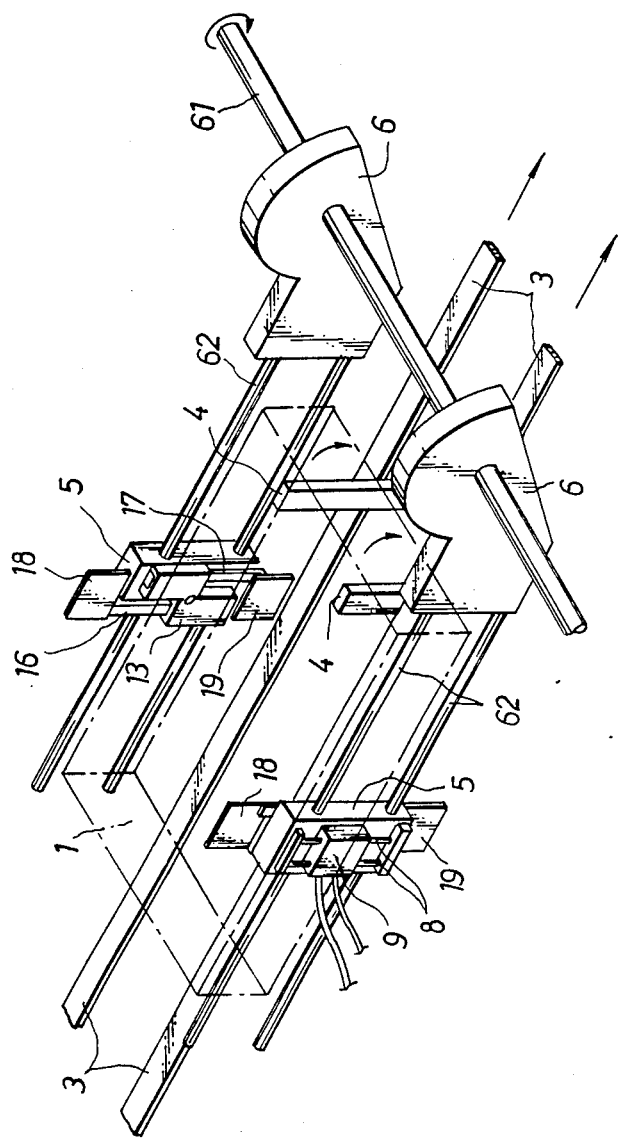
FIG. 2 is a perspective view, on an enlarged scale, of certain parts of the box blank holding device shown in FIG. 1.

In the inverting mechanism of FIGS. 1 and 2, box blanks 1 already folded by the machine are fed one by one from a folded-blank feeding apparatus 2 (only part of which is shown on the left side of FIG. 1) against stops 4 on first rails 3.

When a predetermined number of folded box blanks 1 have been fed so as to form a stack, the two opposite sides of the stack of folded box blanks 1 are engaged and held by a pair of holders 5 provided on respective inverters 6. The inverters 6 are then rotated about a shaft 61 to cause the folded box blanks 1 to be inverted and then placed on second rails 7.

After the folded box blanks 1 have been placed on the second rails 7, the holders 5 release the stack of folded box blanks 1, and the inverters 6 are rotated backward to return to their initial positions.

Figure 3:
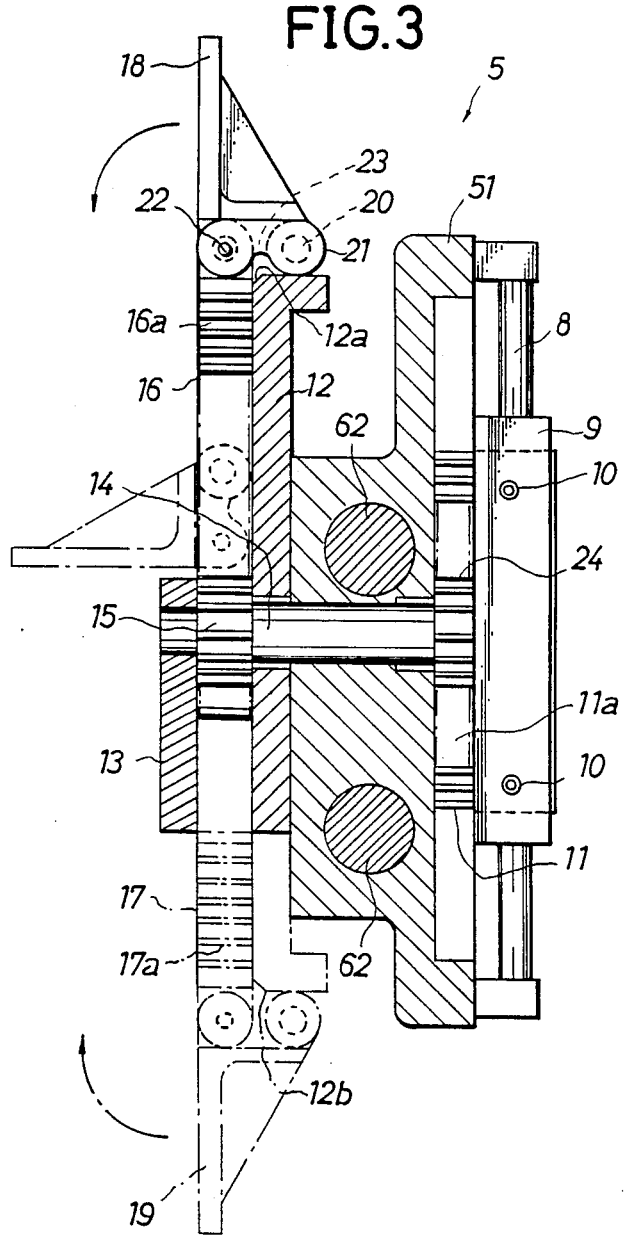
FIG. 3 is a sectional view, on a further enlarged scale, of essential parts of the holding device of FIG. 2.

The pair of holders 5 are mounted on respective bars of pairs of bars 62 on the inverters 6 and each has the construction shown in FIGS. 3–5.

FIG. 3 shows the essential parts of each holder 5 in section, FIG. 4 shows the outer side of a holder 5, and FIG. 5 shows the inner side of a holder 5.

A pair of vertically extending guide rails 8 are fixedly mounted on the outer face of the main body 51 of each holder 5 which is in turn adjustably slidably mounted on the bars 62 of a pair of bars of the inverter 6. An air cylinder 9 is mounted on the guide rails 8 in such a manner as to be vertically movable when air is supplied thereto and discharged therefrom through air supply and discharge ports 10. A driving rack member 11 is mounted on one side of the air cylinder 9, with a portion 11a of the rack member 11 positioned adjacent to the air cylinder 9.

A transmission shaft 14 is rotatably mounted in the center of the holder main body 51 and extends through retracting-and-projecting guide plates 12 and a plate 13 for mounting holding member-actuating rack members, which will be described below.

A pinion 24 is mounted on the end portion of the transmission shaft 14 that is close to the outer face of the body 51, and is in meshing engagement with the rack 11a of the driving rack member 11.

As shown in FIGS. 3–5, the retracting-and-projecting guide plates 12 are fixed on the inner face of the holder main body 51, and they have projecting-and-retracting guide portions 12a and 12b at the upper and lower ends which are each bent perpendicularly and outwardly toward the body 51 in a curved manner. The guide portions 12a and 12b are positioned on the upper-left side and the lower-right side, respectively, as viewed in FIG. 5.

A further pinion 15 is fixed to the transmission shaft 14 at a position inward of the guide plates 12. A pair of holding member-actuating rack members 16 and 17 are disposed on either side of the pinion 15 in a direction perpendicular to the shaft 14, with racks 16a and 17a on the rack members 16 and 17 in meshing engagement with the pinion 15.

The holding member-actuating rack members 16 and 17 are held against the retracting-and-projecting guide plates 12 by the holding member-actuating rack member mounting plate 13 in such a manner as to be movable toward and away from the retracting-and-projecting guide portions 12a and 12b of the guide plate 12, respectively. A pair of box blank holding members 18 and 19 are mounted on the outer ends of the actuating rack members 16 and 17, respectively, in such a manner as to be projectable inwardly of the main body 51 or retractable outwardly thereof.

The holding member used in this embodiment as either of the holding members 18 and 19 has the following structure. Each holding member 18 or 19 is pivotably mounted on the holding member-actuating rack member 16 or 17 on a mounting shaft 22. A roller 21 is rotatably mounted on the holding member behind the mounting shaft 22 on a shaft 20. A spring 23 extends from the mounting shaft 22 and urges the shaft 20 carrying the roller 21 outwardly.

The spring 23 always urges the holding member 18 or 19 to pivot in the direction in which the member is retracted, in other words, in the direction in which the box blank-holding surface of the member 18 or 19 becomes flush with the adjacent surface of the rack member 16 or 17.

The operation of the box blank holding device having the above-described construction will now be explained.

When the device is in a state in which the holding members 18 and 19 are retracted, that is, a state in which the holding member-actuating rack members 16 and 17 are vertically away from the shaft 14, as shown in FIGS. 2, 3 and 5, if air at a predetermined pressure is supplied to the air cylinder 9 through one of the ports 10 and discharged through the other port, the air cylinder 9 is caused to move downward as viewed in the figures. By this action, the pinion 24 is rotated by the rack 11a of the driving rack member 11 mounted on the air cylinder 9, and this rotation is transmitted through the transmission shaft 14 to cause the other pinion 15 to rotate. By the rotation of the pinion 15, the holding member-actuating rack members 16 and 17, having their racks 16a and 17a disposed in meshing engagement with the pinion 15, are moved parallel to each other toward the transmission shaft 14, i.e. downward and upward, respectively, as viewed in the figures. At this time, the holding members 18 and 19 provided on the ends of the actuating rack members 16 and 17 are rotated about the mounting shafts 22 and thus project inwardly as the rollers 21 are moved along the retracting-and-projecting guide portions 12a and 12b of the guide plates 12 and then along the guide plates 12 to the phantom line position as shown in FIG. 3. In this way, the holding members 18 and 19 are caused to engage folded box blanks 1 in the stack therebetween with a predetermined pressure corresponding to the pressure in the air cylinder 9. In practice, the air pressure can be in the range of 5–6 kg/cm$^2$.

Consequently, even when there is variation in the total thickness of the stack of folded box blanks 1, for instance when there is a difference in total thickness of two sides of the stack of folded box blanks 1, as shown in FIG. 6, the variation does not cause any variation in the holding pressure, even though the variation does cause a difference in the amount of the movement of the holding member-actuating rack members 16 and 17.

When it is required to release the folded box blanks 1 from the held condition, air is supplied to each air cylinder 9 through the other of the ports 10 and discharged through the one port, thereby causing the air cylinder 9 to move upward as viewed in the figures. By this action, the holding member-actuating rack members 16 and 17 are moved contrary to the above-described case, i.e. parallel to each other upward and downward, respectively, away from the transmission shaft 14.

When the rack members 16 and 17 have been moved to the ends of the guide plates 12, the rollers 21 are moved by the resilience of the springs 23 so as to roll along the guide portions 12a and 12b toward the outer face of the body 51. This action causes the holding members 18 and 19 to be pivoted around shafts 22 in such a manner that the box blank engaging faces thereof become flush with the surfaces of the rack members 16 and 17, the holding members thus being retracted to their original positions. Thus, the folded box blanks 1 are released from the holding members 18 and 19. It will be seen that with the holding members in the retracted position, the holders 5 can move past the edges of box blanks in a stack on the second rails 7 so as to permit the inverters 6 to swing the bars 62 counterclockwise in FIG. 1 to the initial position adjacent rails 3.

Although the described embodiment of the holding device has the above-described construction and operation, these are mere examples, and the construction and the operation of the device are not limited to those described above. Arrangements such as those described below may be alternatively adopted.

The air cylinders may be replaced by hydraulic cylinders.

The number of holders used may be any suitable plural number in accordance with the object of use.

Each of the cylinders may be fixed to the holder main body and have a movable rod having a rack thereon.

Each of the holding members may be retracted and projected by the use of a guide pin or a guide roller provided behind the holding member and movably received in a retracting-and-projecting groove formed in a guide plate, the holding member-actuating rack members being used and moved in the same manner as that in the foregoing embodiment.

It should be clearly understood that various other changes and modifications may be made in the invention without departing from the spirit and scope thereof.

As has been described above, with the box blank holding device in a box-making machine in accordance with the present invention, it is possible to securely hold box-blanks with a predetermined pressure even when there is a variation in the thickness and hardness or softness of the box blanks, and the device causes no increase in the various dimensions of the box-making machine.

What is claimed is:

1. A box blank holding device for a box-making machine, comprising:
   a holder main body;
   a fluid actuated cylinder mounted on said body;
   a reciprocally movable driving rack connected to said cylinder and moved by the supply and discharge of fluid to and from said cylinder;
   a transmission shaft rotatably supported on said holder main body and having a pair of pinions, one of said pinions being in meshing engagement with said driving rack;
   a pair of holding member-actuating racks disposed on either side of the other pinion on said transmission shaft in meshing engagement with said other pinion;
   retracting-and-projecting guide plates mounted on said holder main body; and
   a pair of holding members pivotally mounted on the ends of said holding member-actuating racks and engaged with and guided by said guide plates for being projectable into positions in which they are in spaced opposed relationship as said holding member-actuating racks are moved toward said transmission shaft for gripping blanks therebetween and for being retractable as said holding member racks are moved away from each other;
   wherein each of said guide plates has a guide portion on the end thereof projecting away from the direction of projection of said holding members, and said holding members each have a roller thereon in rolling engagement with the corresponding guide portion, said device further comprising means for retracting said pair of holding members, said means comprising a resilient member engaging each holding member for urging the holding member to pivot in the retracting direction, whereby when each of said holding member-actuating racks is moved toward said transmission shaft, each of said rollers moves along the corresponding guide portion and then along the corresponding guide plate so as to cause each of said holding members to project, and when said holding member-actuating racks are moved away from said transmission shaft, when said rollers reach the respective guide portions, said holders are urged to pivot to the retracted position by said resilient members to cause said rollers to move along the corresponding guide portions.

2. A box blank holding device as claimed in claim 1, in which said holding members each have a shaft thereon on which the corresponding one of said rollers is rotatably mounted, and said resilient member is a spring on said rack and engaged with said shaft.

3. A box blank holding device as claimed in claim 1, further comprising guide rails on said holder main body on which said cylinder is movable by the supply and discharge of fluid therefrom, said driving rack being mounted on said cylinder.

* * * * *